April 18, 1933.  M. ALPERN  1,904,846
AUTOMATIC FLUID CONTROL SYSTEM
Filed Feb. 26, 1930  8 Sheets-Sheet 2

Fig. 2.

Inventor:-
Maxwell Alpern,
by his Attorneys,
Howson & Howson

April 18, 1933. M. ALPERN 1,904,846
AUTOMATIC FLUID CONTROL SYSTEM
Filed Feb. 26, 1930 8 Sheets-Sheet 3

Inventor:-
Maxwell Alpern,
by his Attorneys,
Howson & Howson

April 18, 1933.   M. ALPERN   1,904,846
AUTOMATIC FLUID CONTROL SYSTEM
Filed Feb. 26, 1930   8 Sheets-Sheet 8

Inventor:-
Maxwell Alpern,
by his Attorneys,
Howson & Howson

Patented Apr. 18, 1933

1,904,846

UNITED STATES PATENT OFFICE

MAXWELL ALPERN, OF PHILADELPHIA, PENNSYLVANIA, ASSIGNOR TO AMERICAN ENGINEERING COMPANY, OF PHILADELPHIA, PENNSYLVANIA, A CORPORATION OF PENNSYLVANIA

AUTOMATIC FLUID CONTROL SYSTEM

Application filed February 26, 1930. Serial No. 431,522.

This invention relates to automatic fluid control systems and more particularly to a means for automatically controlling the passage of fluid to tuyères of stoker furnaces. In a prior application, Serial No. 262,935, filed March 19, 1928, and since matured into Patent No. 1,745,238, dated January 28, 1930, I have described a system wherein the tuyère banks of the furnace are subdivided into groups to which groups the air is fed through suitable nozzles from a common wind box. The passage of the air through each nozzle in such a construction will, of course, be determined by the depth of the fuel bed above the particular group with which the nozzle is associated. If there is no fuel above this group there would be a tendency of the air to rush through this nozzle and in so doing to blow the fuel from the group and prevent reformation of the bed. To prevent this, I have described in the application above mentioned an air control system including dampers and a motor which is associated with each fuel nozzle, the motor acting in response to differential pressures resulting from freeing of the air through thinning of the fuel bed or choking of the air through thickening of the fuel bed to move the dampers so that in the first event the supply of air is substantially cut off and in the second event the supply of air is increased. The mechanisms associated with the various nozzles are illustrated as interconnected with one another so that when air is cut off from a nozzle in response to a thinning of the fuel bed the operation of the motor which affects the dampers is transmitted to the damper mechanisms of the other nozzles to increase the opening of the dampers thereof and thus increase the supply of air to the fuel bed above the nozzles. The mechanism illustrated is mechanical and while operative for the purpose for which it is intended occupies a considerable space in the furnace and is more or less expensive to maintain.

An important object of this invention is to provide a means permitting the interconnection between the various nozzles to be effected hydraulically thus greatly reducing the numbers of moving parts and substituting for relatively long levers extending through the wind box of the furnace conduits which transmit the fluid pressure from one to another of the control mechanisms.

A further and more specific object of the invention is to provide a construction wherein the motor associated with the damper of each nozzle is caused to operate a piston thereby generating fluid pressure which may be transmitted from one to another of the mechanisms and which will select the mechanism in which the resistance to movements is least and deliver its forces thereto.

These and other objects I attain by the construction shown in the accompanying drawings wherein, for the purpose of illustration, I have shown preferred embodiments of my invention and wherein:

Referring now more particularly to the drawings, the numeral 10 generally designates the tuyère banks of a furnace supported from retort side plates 11 adjacent faces of which beneath the tuyère banks are connected by transverse partitions 12 producing nozzles 13 an extension of which to the tuyère proper is provided through extension partitions 14 carried by certain of the tuyères.

Beneath each nozzle 13 and communicating therewith is a control box 15 including opposed transversely-extending end walls 16 and 17 and side walls 18. From the bottom of the control box a transverse partition 19 extends upwardly for a short distance and the upper end of the front end wall 17 has a rearwardly-extending wall section or flange 20 the rear end of which overlies the upper end of partition 19. Between this flange 20 and the partition 19 are disposed vertically-extending damper elements 21 which are pivoted so that they may shift from a position where they permit passage of fluid from the opening 22 of the bottom lying forwardly of partition 19 to the opening 23 at the top which communicates directly with the nozzle 13 to a position where they cut off communication between these openings. The bottom opening 22 is adjustable as to affect the depth through an adjustable vane 24 which inclines upwardly and rearwardly into the control box and which has attached thereto a slidable plate 24' effecting a seal between the lower end of the vane in adjusted positions and the lower end of the front wall 17.

Between the front face of vane 24 and the front wall is arranged a motor comprising a partition element 25 pivoted at its upper end as at 26 to the front wall at a point well spaced above the upper end thereof so that its lower end may swing toward and away from the lower end of the front wall. Supported from the lower end of the front wall and at the rear face thereof is a sealing mechanism generally designated at 27 which includes a sealing strip 28 vertically adjustable through screws 29 mounted in brackets 30 carried by the front wall. The lower end of the partition element 25 is transversely widened and arcuated as at 31 so that when this partition element swings to its pivot a contact between this lower end and the seal may be maintained. Partition element 25 is connected through crossed adjustable rods 32 to the dampers 21 so that the same are moved in response to movement of the partition element inwardly to a closed position and to a movement of the partition element outwardly to an open position.

To the outer front face of the partition element an adjustable rod 33 is connected and projects through an opening 34 formed in the front wall. The front wall in alignment with the partition element is apertured as at 35 so that the pressure between the partition element and said front wall will be that of the wind box of the furnace into which the control box extends.

The mechanism above described with the exception of certain details in the construction of the various elements is identical with that set forth in my copending application Serial Number 399,315, filed October 12, 1929, which is a division of the prior application above identified, and illustrated in Figs. 11 to 16 inclusive of the drawings forming a part of such divisional application.

In accordance with the present invention I support from the control boxes 15 diaphragm chambers 36 preferably aligned. Control boxes 15 of adjacent tuyère banks have suspended therefrom a transversely-extending roll 37, this roll having adjustably directed therethrough a threaded central extension 38 on the bottom of the diaphragm chamber. Set screws 39 adjustable through the roll and engaging the bottom of the diaphragm chamber serve to hold it in a predetermined elevated position while the lock and jam nuts upon the threaded extension and engaging beneath the roll serve to limit upward movement thereof. The diaphragm chambers can thus be held in a desired adjusted position with relation to the roll to compensate for variations in level occurring through inaccuracies of installation or through warping of the furnace structure. The diaphragm chamber proper comprises a base 40, side walls 41 and a cover 42. Side walls 41 are preferably formed in separable sections the upper section comprising an annular ring 43 seating upon a flanged portion of the lower section and co-acting therewith to clamp the margin of a flexible diaphragm 44. Of the bolts 45 securing the annular section 43 in position one may be employed to secure the cap 42 as illustrated.

Upon the upper surface of the diaphragm 44 a piston 46 is disposed, the attachment of the piston to its stem 47 serving to secure the piston to the diaphragm at the center thereof as indicated at 48. Stem 47 projects into a central aperture 49 formed in cap 42 and has adjustably threaded therein an extension 50 which projects through the cap and is bifurcated to receive between the arms thereof the short arm 51 of a bell crank lever, the longer arm 52 of which extends vertically and at its upper end is pivotally connected to the rod 33. The bell crank lever is at present illustrated as supported upon a pivot 53 mounted in a pair of ears 54 arising from the cover 42. The space of each diaphragm chamber 36 beneath the diaphragm 44 thereof is in communication with similar spaces of adjacent diaphragm chambers through conduits 55.

It will be obvious that if in the operation of the furnace the fuel bed is of uniform depth and, accordingly, offers uniform resistance to the passage of air through the various nozzles 13, the differential in pressure in the enlarged spaces of chambers 56 provided within the control box above the upper end of vane 24 and the space between the motor and the front wall will be uniform in each instance and, accordingly, each motor will act to shift its vanes and diaphragm piston in the same direction and with the same force. Under these conditions a static balance is maintained and there is no movement. Let it be assumed, however, that the fuel bed thickens above one of the nozzles 13 and reduces in thickness above the second nozzle; in this event the resistance to passage of air through the first nozzle is increased while the resistance to passage of air at the second nozzle is decreased. Air at the second nozzle will, accordingly, move with considerable speed through the chamber and the effective pressure within the chamber 56 will be materially reduced so that the pressure of the wind box entering through the openings 35 will cause the motor to move with considerable force in a direction tending to close the dampers associated with the second nozzle. Simultaneously with the closing of the dampers the upper end of the long arm 52 of the diaphragm lever is shifted resulting in downward movement of piston 46 and diaphragm 44. The pressure set up by this action is transmitted through the conduits 55 and seeking an outlet is transmitted to all of the associated diaphragm chambers. Since at the first nozzle the resistance to movement of air has caused an increase in the pressure within the chamber 56 associated therewith there will be the least resistance to movement of the diaphragm of this first nozzle so that this diaphragm is shifted and the dampers 21 of the first nozzle are opened to a greater extent. The remaining dampers will occupy substantially the same position which they occupied before this operation was effected to adjust the dampers of the first and second nozzles mentioned.

It will be obvious that a construction of this character can be conveniently employed in a furnace having considerable width and where the installation of a leverage system must necessarily be accompanied by complication.

Figure 1:
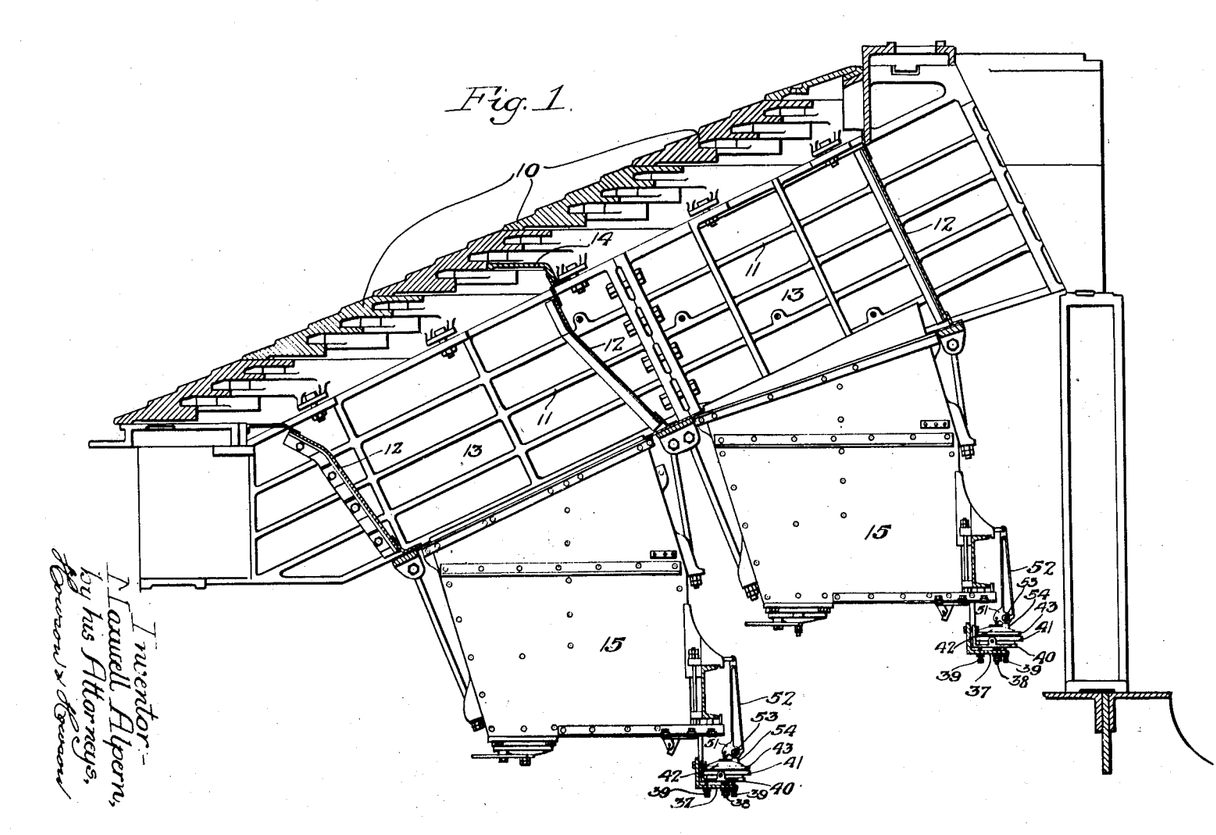
Fig. 1 is an assembly view partially in section illustrating fluid control mechanism constructed in accordance with my invention as applied to a stoker furnace.
Figure 2:
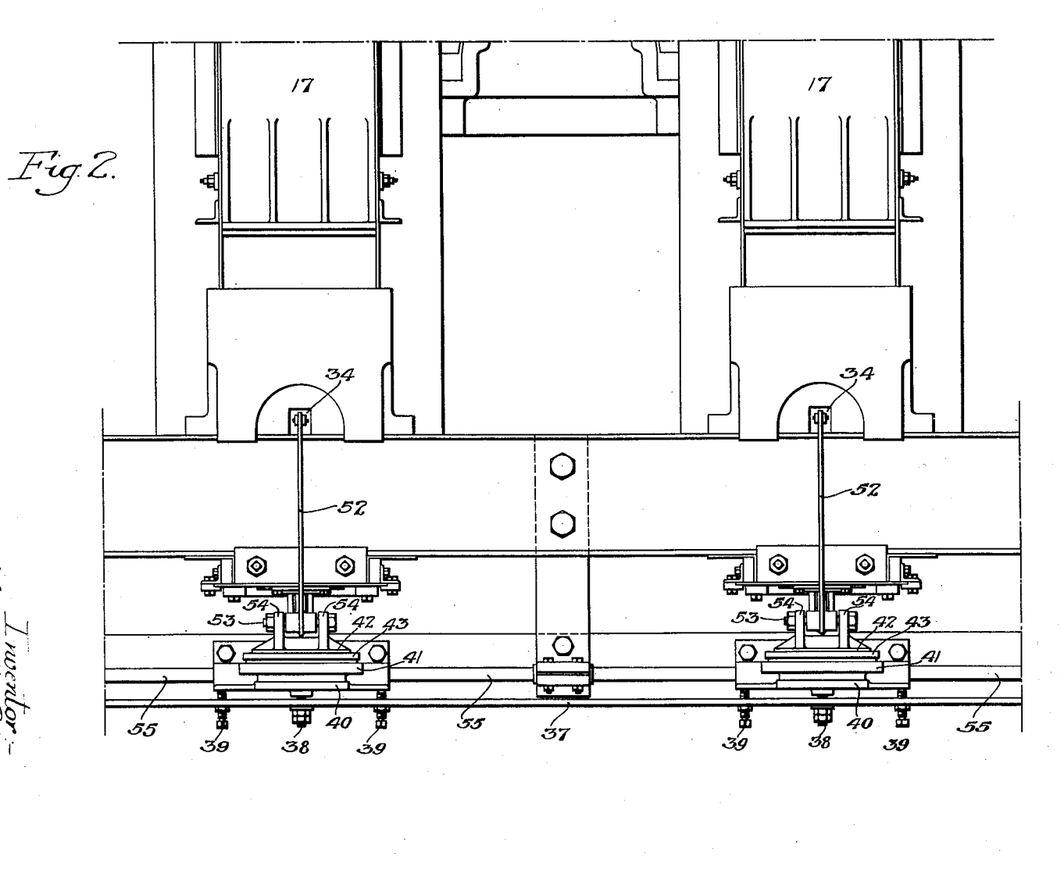
Fig. 2 is an enlarged elevation of two adjacent control boxes and the transmission connection therebetween.
Figure 3:
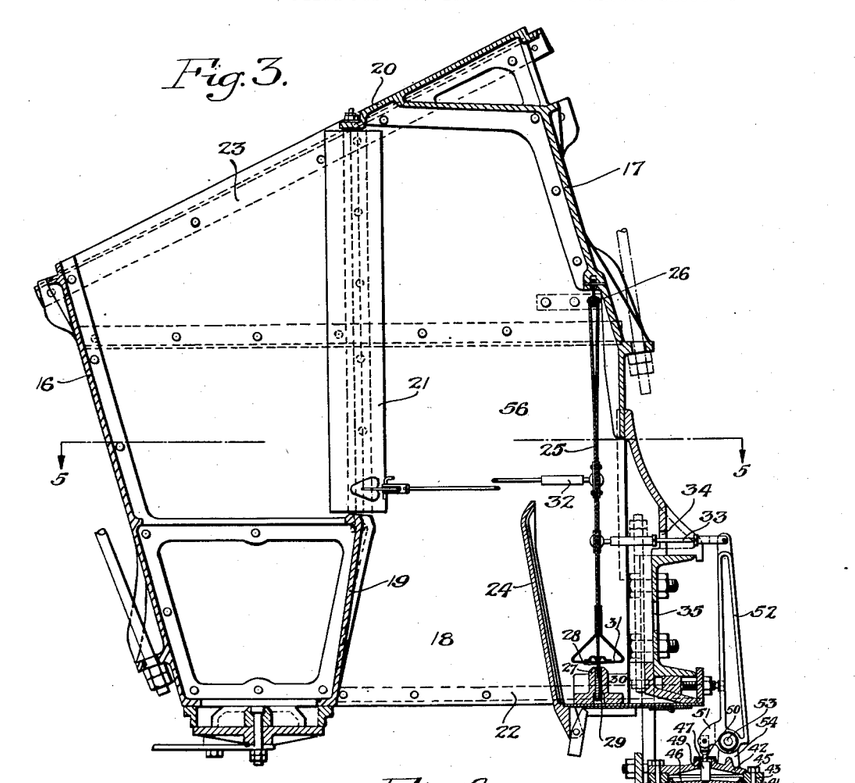
Fig. 3 is a vertical sectional view through one of the control boxes and its associated transmission element.
Figure 4:
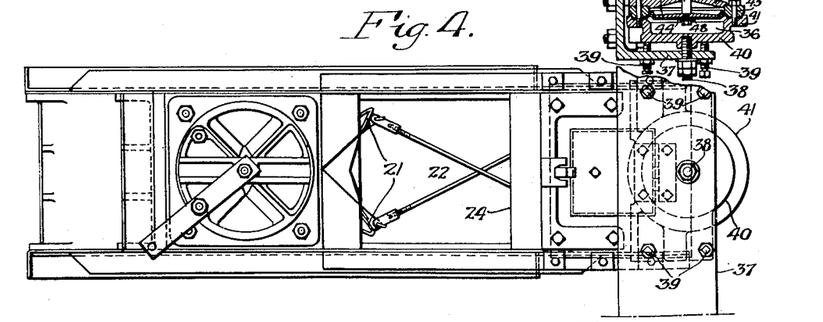
Fig. 4 is a bottom plan view of a control box.
Figure 5:
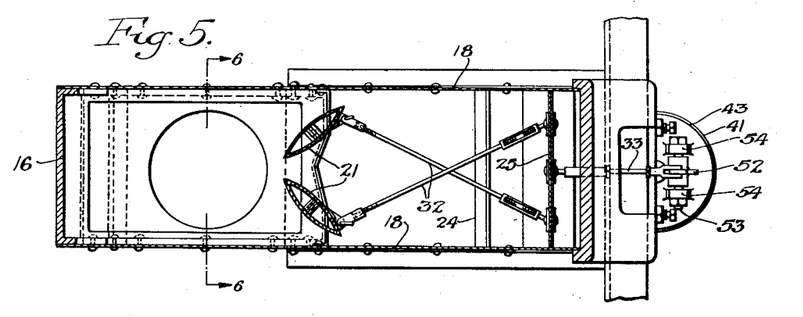
Fig. 5 is a section on line 5—5 of Fig. 3.
Figures 6, 7:
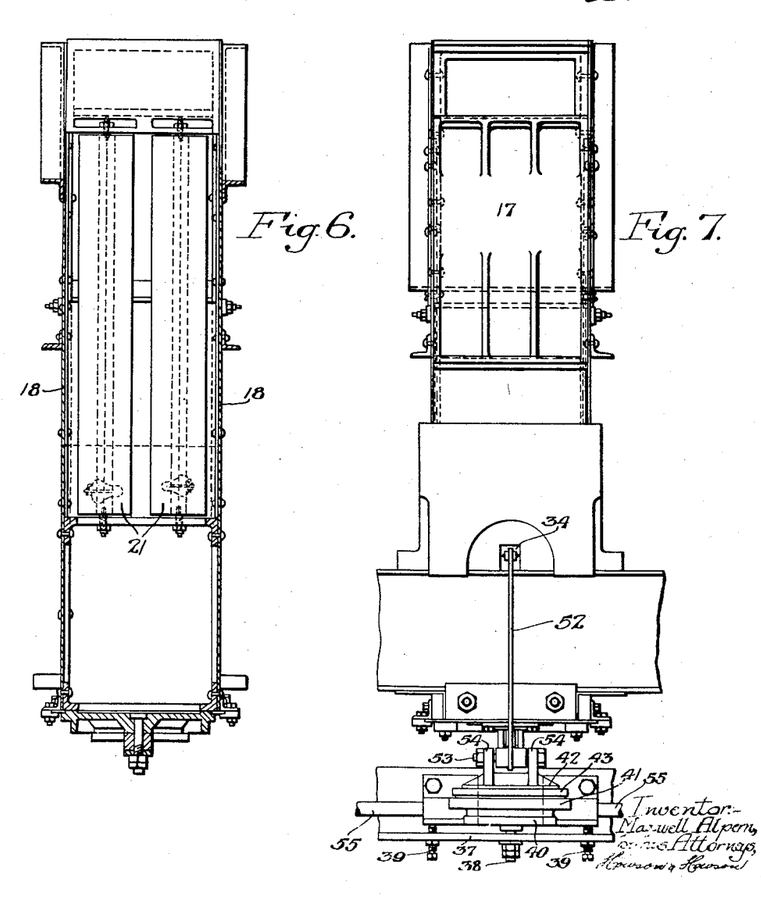
Fig. 6 is a section on line 6—6 of Fig. 5.
Fig. 7 is a front elevation of one of the control boxes.
Figure 8:
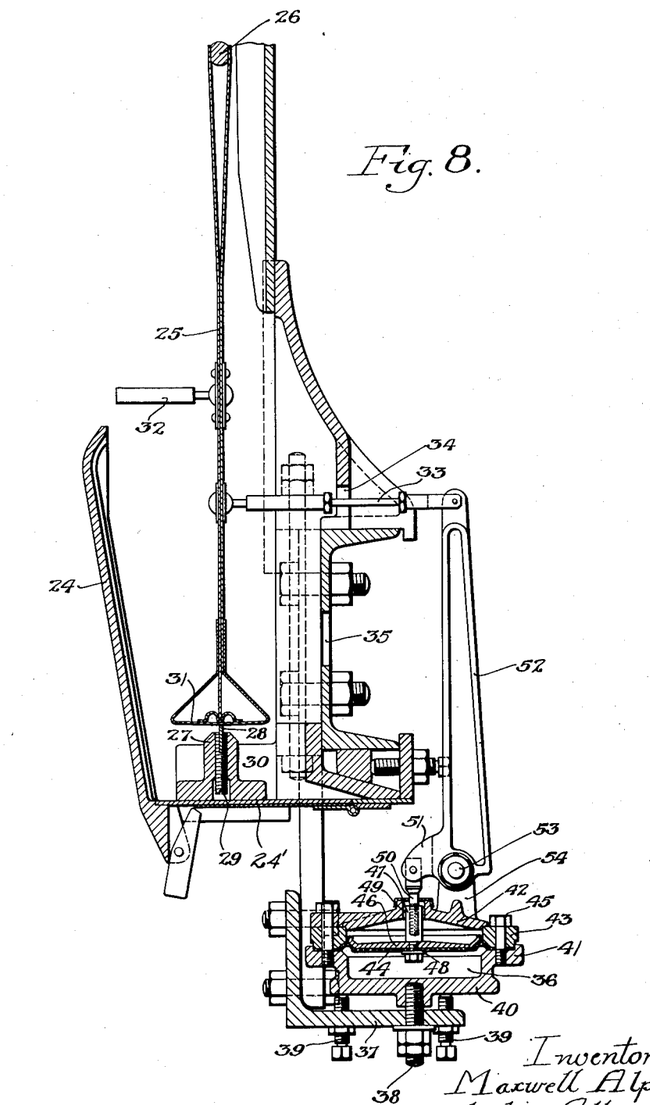
Fig. 8 is an enlarged detail sectional view through the controlling vane and the associated transmission element.
Figure 9:
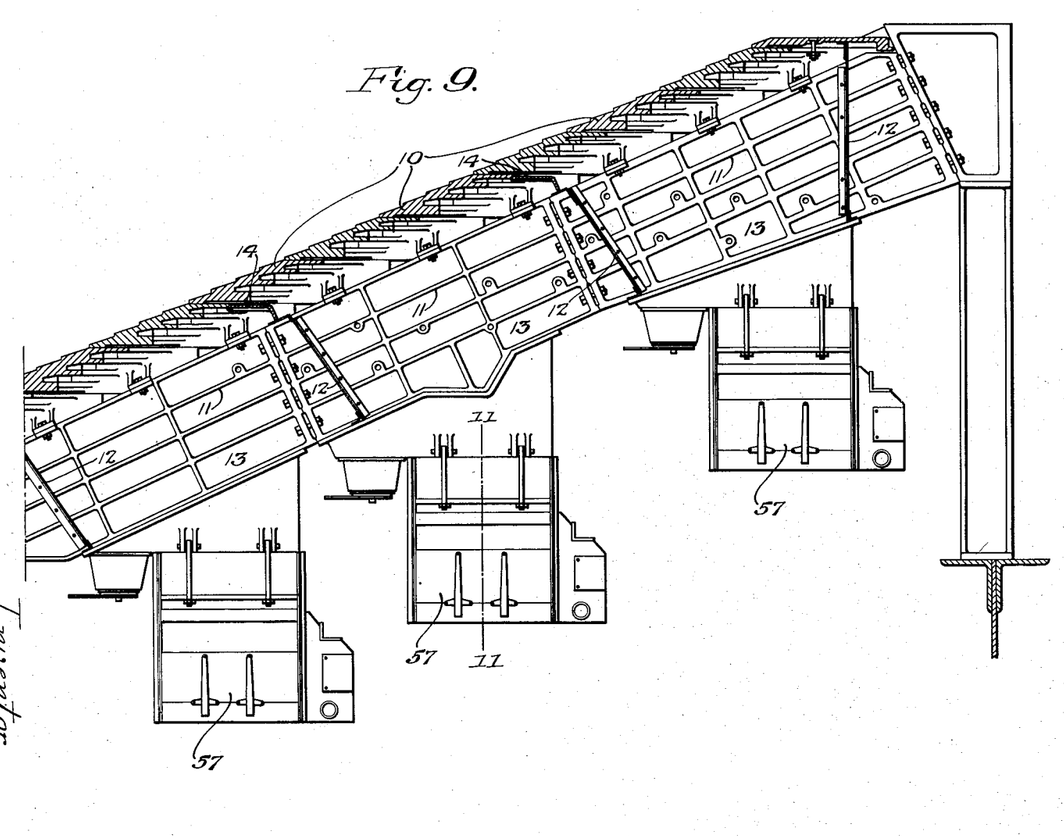
Fig. 9 is a view similar to that of Fig. 1 illustrating the use of a different type of control box.
Figure 10:
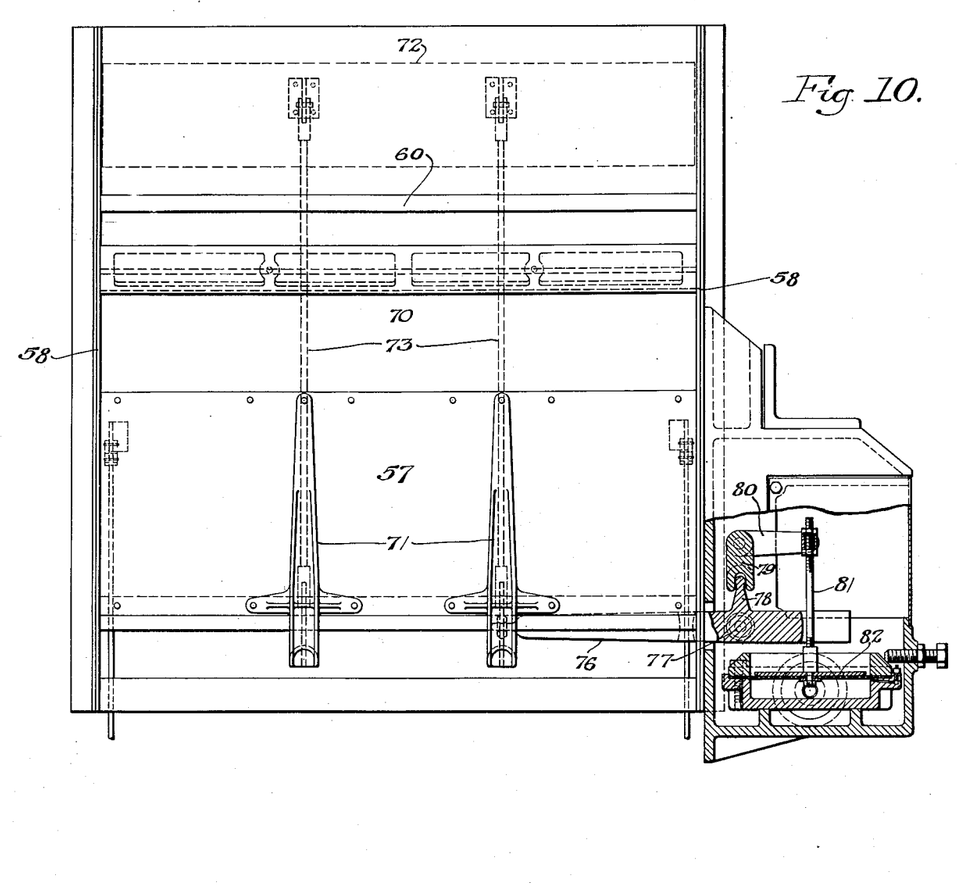
Fig. 10 is a side elevation of a control box of the type illustrated in Fig. 9, the transmission mechanism being illustrated as partially in section.
Figure 11:
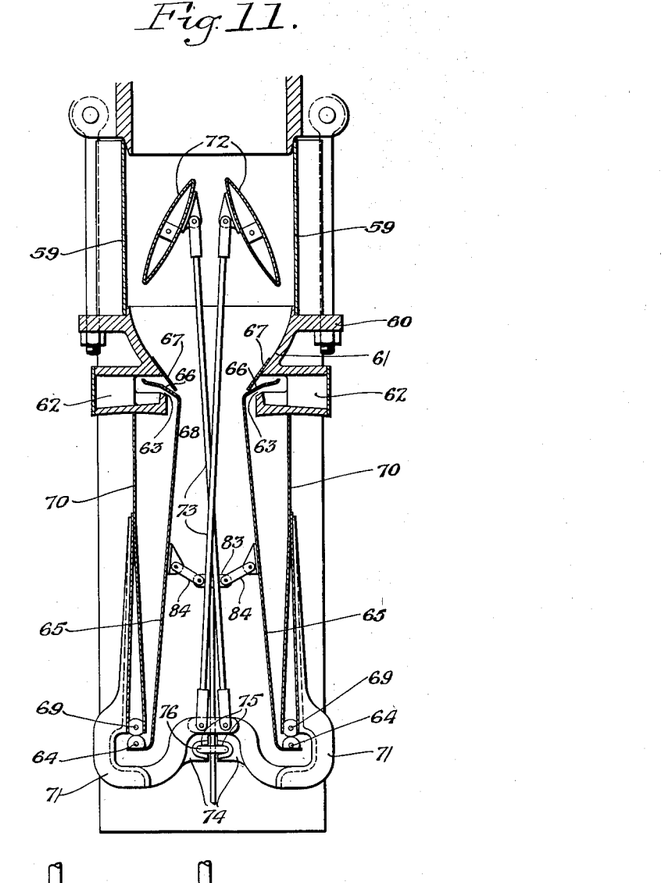
Fig. 11 is a vertical sectional view on line 11—11 of Fig. 9.
Figure 12:
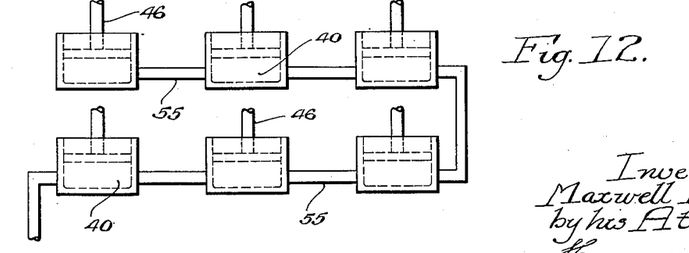
Fig. 12 is a diagrammatic view illustrating the interconnection of the transmission elements and the associated motor shafts.

While I have above described the use of a control motor embodying but a single vane, it will be obvious that more than one vane can be employed in this motor if so desired and in Figs. 9 to 11 I have illustrated a construction of this character. In these figures the control box 57 embodies end walls 58 and side walls 59 which terminate well above the lower ends of the end walls and abut the upper ends of throat castings 60 which castings have inwardly and downwardly-extending wall sections 61 which combine to produce an upwardly enlarging throat and beneath these wall sections are formed to provide substantially horizontally-extending chambers 62 the inner ends of which have longitudinally-extending openings 63 formed therein. Pivoted between the end walls adjacent the lower ends thereof as at 64 are a pair of upwardly converging plates 65 the upper ends of which have out-turned portions 66 entering the cavities 62 through openings 63. An extension 67 upon the stationary throat forming walls projects in close proximity to the upper surface of the angular portion 66 but still provides an air space permitting passage of air about the angular extension so that communication is established through the Venturi throat 68 produced by the stationary and throat forming walls 61 and 65 and the space exterior to the movable wall section 65. Pivoted to the end walls as at 69 are a pair of motor vanes 70 the upper ends of which co-act with the under surface of the bottom walls of the chambers 62 which are arcuated so that contact can be maintained in all positions of the vane. The pivots 64 and 69 of the movable wall 65 and vanes 70 are preferably arranged to maintain contact effecting a seal therebetween. Each motor vane has one or more angular arms 71 which extend downwardly under the pivots 64 of movable wall 65 and to the approximate center of the space between these walls. Within the control box above the throat casting 60 are pivoted a pair of control dampers 72 which are connected with the arms 71 through adjustable links 73. A pair of such arms is provided with opposing portions 74 adjacent faces of which are notched as at 75 to receive an end of an actuating bar 76 which extends through an opening formed in an end wall and has its outer end pivoted as at 77 and provided with an upwardly-extending portion 78. A bell crank lever mechanism, including a depending arm 79 notched for the reception of the upwardly-extending portion 78 and a horizontal portion 80 to which is secured the rod 81 of the diaphragm piston 82, serves to provide the operating connection.

In the construction above described adjacent end walls are preferably provided with vertically adjustable heads 83 which are connected by links 84 to the inner faces of the movable wall section. Through these heads the wall sections may be moved inwardly or outwardly to increase or decrease the effective size of the Venturi throat and thus to increase or decrease the differential in pressure resulting when the fuel bed reduces in thickness. By regulation of these walls the extent through which the fuel bed may reduce in thickness before an operation of the motor and a corresponding action of the dampers may be closely regulated. Interconnection of the diaphragm chambers 85 is made in a manner similar to that described in connection with the previous structure.

Since the construction employed is obviously capable of a certain range of change and modification without departing from the spirit of my invention, I do not wish to be understood as limiting myself thereto except as hereinafter claimed.

I claim:

1. In a fluid system including a series of ducts, a device in each duct automatically throttling the flow of liquid in the duct in inverse proportion to the resistance offered to said flow and a hydraulic interconnection between said devices whereby the throttling operation of any of said devices is accompanied by a reverse throttling in another device or devices.

2. In a fluid system including a series of ducts, a device in each duct automatically throttling the flow of fluid in the duct in inverse proportion to the resistance offered to said flow, a hydraulic cylinder associated with each device and operated to compress fluid therein during a throttling operation of the device in one direction and an interconnection between said hydraulic devices whereby the throttling operation in said direction of any one of said devices is accompanied by the reversed throttling operation by another or others of said devices.

3. In a fluid system including a plurality of ducts, a throttle for each duct, an operating means for the throttle of each duct and hydraulic means interconnecting the throttle-operating means of the various ducts for relatively varying the flow in said ducts while maintaining a substantially uniform aggregate flow.

4. In a fluid system including a plurality of ducts subject to variable and differing resistances creating relatively ununiform flows therethrough, a throttle for each duct, an operating means for the throttle including an element moving under pressure differentials in the duct created by said variable resistances, a hydraulic cylinder connected with said operating means and actuated thereby and an interconnection between the hydraulic cylinders of the ducts providing for direct transfer of pressures from one cylinder to another.

5. In a fluid system including a series of ducts subject to variable and differing resistances creating relatively ununiform flows therethrough, a throttle for each duct, an operating motor for each throttle including a member moving in response to variations in pressure in each duct, a hydraulic cylinder, a connection between the piston of the cylinder and the movable element and hydraulic interconnection between the several cylinders.

6. In a fluid system including a series of ducts, a device in each duct for automatically throttling the flow of fluid in the duct in inverse proportion to the resistance offered to said flow including a movable member, a fluid chamber associated with the movable member and affected in response to movements thereof to compress or relieve a liquid contained therein and a hydraulic connection between the several chambers.

7. In a fluid system including a plurality of ducts, means for throttling fluid in each duct in inverse proportion to the resistance to flow through the duct, including a movable vane, a fluid chamber associated with each duct, a piston for compressing fluid in the chamber, link and lever connections between each piston and its associated vane and fluid transmission connections between the several fluid chambers.

8. In a fluid system including a plurality of ducts subject to variable and differing resistances creating relatively ununiform flows therethrough, a throttle in each duct, a motor including a part moving in response to pressure variations in the duct, an operating connection between the motor and the throttle, a hydraulic system common to all of the ducts and means operated by movement of each throttle for compressing or relieving pressure in said hydraulic system.

9. In a fluid control system, a duct, a throttle within the duct, a motor for operating the throttle operated by variations in pressure in the duct in advance of the throttle, and means providing a constricted throat for the duct between the motor and throttle adjustable as to width, said means being mounted independently of said motor.

10. In a fluid control system, a duct, a throttle within the duct, a pair of movable vanes constituting side walls for the duct in advance of the throttle, said vanes moving about pivots supported from the end walls of the duct, a pair of movable wall elements arranged inwardly of the vanes and converging toward the throttle to produce a constricted throat for the duct, said wall elements forming with the respective vanes chambers communicating with said throat, and means for moving said wall elements.

11. In a fluid control system, a duct, a throttle within the duct, a pair of movable vanes constituting side walls for the duct in advance of the throttle, said vanes moving about pivots supported from the end walls of the duct, a pair of movable wall elements arranged inwardly of the vanes and converging toward the throttle to produce a constricted throat for the duct, said wall elements forming with the respective vanes chambers communicating with said throat, means for moving said wall elements, and an operating connection between said throttle and said vanes.

12. In a fluid system including a plurality of ducts a throttle in each duct, a motor including a pivoted vane moving in response to pressure variations in the duct, an operating connection between the motor and the throttle, a cylinder associated with each motor, a piston for compressing fluid in the cylinder connected to the motor to be moved thereby, and a connection between the cylinders associated with the several ducts.

13. In a fluid system including a plurality of ducts subject to variable and differing resistances creating relatively ununiform flows therethrough, a throttle in each duct, a motor includng a part moving in response to pressure variations in the duct, an operating connection between the motor and the throttle, a chamber associated with each duct including a flexible wall and a connection between the movable element of the motor of the associated duct and said flexible wall for moving the flexible wall, and means providing for a direct transfer of pressure from one of said chambers to another due to movement of said wall.

14. In a fluid system including a plurality of ducts subject to variable and differing resistances creating relatively ununiform flows therethrough, a throttle in each duct, a motor including a part moving in response to pressure variations in the duct, an operating connection between the motor and the throttle, a chamber associated with each duct including a flexible wall, a connection between the movable element of the motor of the associated duct and said flexible wall for moving the flexible wall, and a duct connecting between the chambers of the several ducts.

15. In a fluid system, a series of ducts, and means for delivering fluid to said ducts from a common pressure source, said ducts being subject to variable and differing resistances creating relatively ununiform flows therethrough, and a device for automatically throttling the flow of fluid in each of said ducts in inverse proportion to the resistance offered to the flow therethrough and adapted to maintain a substantially constant aggregate flow from the ducts of the series, said device including hydraulic means operatively connecting the parts of said device associated with the respective ducts.

16. In a fluid system, the combination with a plurality of ducts connected with a common pressure source, said ducts being subject to variable and differing resistances creating relatively ununiform flows therethrough, of a device in each of said ducts for automatically throttling the flow of fluid therein in inverse proportion to the resistance offered to said flow, and hydraulic mechanism interconnecting said devices and maintaining therewith a substantially constant aggregate flow from the ducts of the series.

17. In a fluid system including a series of ducts subject to variable and differing resistances creating relatively ununiform flows therethrough, a throttle for each of said ducts, an operating motor for each throttle including a member movable in response to variations in pressure in said duct, and hydraulic means operatively connected with each of said throttles for transmitting the movement of the throttle of one of said ducts to the throttle of another.

18. In a fluid-controlled system, the combination with a duct having a constricted throat portion, a throttle in said duct, and a motor for operating the throttle including a pivoted element extending longitudinally of the duct in advance of the throat portion and having its free end located adjacent said throat.

19. In a fluid control system, a duct, a throttle within the duct, a pair of pivotally mounted partitions having their free ends converging toward the throttle to produce a constricted throat for the duct, a pivoted vane arranged outwardly of each of said partitions and constituting side walls of said duct in advance of the throttle, said vanes forming with the respective partitions chambers communicating with said throat, means for adjusting said partitions about their respective pivots, and an operating connection between said throttle and said vanes.

20. In a fluid control system, a duct, a throttle within the duct, a pair of movable partitions converging toward the throttle to produce a constricted throat for the duct, a movable vane arranged outwardly of each of said partitions and constituting side walls of said duct in advance of the throttle, said vanes forming with the respective partitions chambers communicating with said throat, means for adjusting said partitions to regulate the size of said throat and an operating connection between said throttle and said vanes.

21. In a fluid control system, a duct, a throttle within the duct, a movable partition arranged to produce a constricted throat for the duct, a movable vane arranged outwardly of said partition and constituting a side wall of said duct in advance of the throttle, said vane forming with the partition a chamber communicating with said throat, means for adjusting said partition to regulate the size of said throat, and an operative connection between said throttle and said vane.

22. In a fluid system, the combination with a fluid supply chamber, of a plurality of ducts projecting into said chamber and constituting discharge outlets from the latter, a throttle within each of said ducts, movable members located within the chamber and respectively constituting a side wall of said ducts in advance of the throttles, a movable partition element arranged inwardly of each of said movable walls and arranged to produce a constricted throat for the associated duct, means for adjusting said partitions to regulate the sizes of the respective throats, means for operatively connecting the throttles with the movable wall members of their respective ducts, the said partitions being so relatively arranged with respect to their associated wall members as to provide a space therebetween communicating with said throat, and means for operatively connecting the movable wall members of said ducts whereby movement of one of said members tends to effect a reverse movement of another of said members.

23. In a fluid system, the combination with a duct projecting into said chamber and constituting a discharge passage therefor, of a throttle adjustably mounted within the duct, a movable vane mounted within said chamber and constituting a side wall of the duct in advance of the throttle, a movable partition arranged inwardly of the vane and arranged to provide a constricted throat for the duct converging toward the throttle, said partition and vane being arranged to form therebetween a chamber communicating with said throat, means for adjusting said partition to regulate the size of said throat, and means for operatively connecting said throttle and said vane.

24. In a fluid control system, a fluid supply chamber, a duct projecting into said chamber and constituting an outlet passage for the latter, a pair of movable vanes located within the chamber and constituting side walls for the duct in advance of the throttle, a pair of movable partitions arranged inwardly of the vanes and converging toward the throttle to produce a constricted throat for the duct, said partitions forming with the respective vanes chambers communicating with said throat, means for adjusting said partitions to regulate the size of said throat, and means for operatively connecting the said vanes with the throttle.

MAXWELL ALPERN.